FIG. I

EFFECT OF ADDITION OF MgO ON IMPROVEMENT IN SATURATED SALT WATER MUD YIELD OF DRILLING MUD CLAYS.

3,185,642
DRILLING FLUID AND MUD THICKENING AGENT THEREFOR
Edgar W. Sawyer, Jr., and Walter L. Haden, Jr., both of Metuchen, N.J., assignors to Minerals & Chemicals Philipp Corporation, Menlo Park, N.J., a corporation of Maryland
Filed June 12, 1961, Ser. No. 116,607
20 Claims. (Cl. 252—8.5)

The subject invention relates to aqueous drilling fluids for use in the rotary drilling of wells and relates, especially, to an improvement in a thickening agent therefor.

In the rotary drilling of wells, a drilling mud or fluid is introduced into the formation to remove the cuttings, cool the bit and seal formations. The mud must be sufficiently viscous to carry the cuttings from the well bore and to suspend particles of weighting agent. However, the mud viscosity must not be so high as to interfere with the action of pumps which circulate the drilling fluid in the formation. Generally speaking, the Stormer viscosity of a drilling fluid should be within the range of about 10 to 40 cp., more usually about 15 to 30 cp.

Colloidal clays, preferably specially processed clays, are most generally employed to impart the desired viscosity to drilling fluids. In some drilling operations, formation solids are used, alone or together with special clays, although formation solids are usually very inferior as compared to special drilling mud clays.

The mud-making qualities of a clay are indicated by certain properties of an aqueous suspension of the clay. Among the most important of these properties is the yield of the clay, the term "yield" being defined as the number of barrels of mud having an apparent viscosity of 15 cp. (as determined on a Stormer-type viscometer) that can be made from one ton of clay. In the case of salt-water muds, the yield of the clay in a saturated sodium chloride solution is determined, since such a value is indicative of the performance of the mud in its intended application. The API procedure for determining mud yield is set forth in API RP–29, Standard Field Procedure for Testing Drilling Fluid, fourth edition, Section A–II, A25–A30 (May 1957).

It is very desirable to make up drilling fluids at low solids to obtain faster bit penetration rates. Therefore, it is highly advantageous to make up muds with the highest yield clay available. However, in selecting a clay for use in drilling a formation, careful consideration must also be given to the choice of a clay which can tolerate any contamination expected to be encountered during drilling without appreciable yield reduction. If a mud is made up with a clay whose mud yield decreases appreciably upon contamination, excessive clay solids will be needed to develop sufficient viscosity in the system to remove cuttings from the well bore.

Hydratable clay (i.e., swelling bentonite clay) has been widely used in the making of drilling muds. This type of clay, described in Encyclopedia of Chemical Technology, vol. 4, page 53, has a micaceous structure, viz., the individual particles are thin flat sheets stacked in mica-like layers. When the base exchange sites of bentonite clay are largely occupied by sodium ions this clay swells in water to a volume 8 to 15 times its dry volume as a result of hydration. The swelling of the clay is decreased sharply when the base exchange positions are occupied by cations such as calcium or magnesium or when a high concentration of any salt, such as sodium chloride is present. Therefore, swelling (sodium) bentonites have a relatively high yield in fresh water, e.g., a yield of about 100 bbl./ton for a good grade. However, such clay has a very low yield or is incapable of maintaining a high yield in water containing ions that prevent swelling of the clay. Therefore, hydratable clays, such as Wyoming bentonite, present difficulties when a drilling mud must be made up with sea water or brine (as, for example, in certain coastal drilling operations) or when the mud becomes contaminated during drilling through formations of salt, gypsum, anhydrite and the like. Chemical treatments, such as the conversion of bentonitic muds to so-called red muds, lime muds and gyp muds, are required when bentonitic shale or commercial bentonite drilling muds are contaminated with salts of sodium, calcium and magnesium. These treatments may represent a substantial portion of the total cost of the mud.

Therefore, when sea water or brine must be used in making up a drilling mud or where formations of soluble salts of Na, Ca and Mg are expected to be encountered in drilling, a recommended procedure is to use a special type of clay or fullers earth which is mined in Georgia and Florida instead of local clays or commercial bentonite drilling mud clay. This unique type of clay, known as "attapulgite clay," is particularly useful for low solids salt water, gyp and high temperature muds because salt and other electrolytes, as well as high temperature, do not adversely effect the colloidal properties of this clay as they do bentonite clay. This is because the mud-making properties of attapulgite clay do not depend upon particle hydration. Instead, attapulgite clay thickens water as a result of a unique orientation of charged colloidal attapulgite needles in the dispersion medium.

In the production of drilling mud clay of the attapulgite type it is common practice to extrude the raw clay to improve its mud-making properties. In a typical operation, the raw clay is crushed to a size not greater than about one-quarter inch in thickness. Water is added in amount sufficient to provide a mixture of extrudable consistency, typically to produce a mixture of 50% to 60% V.M., and the mixture is pugged and extruded under pressure in an auger type extruder through a die plate. The extrudate is then dried to a V.M. of about 20% to 25%. The term "V.M." refers to volatile matter which is the weight percent of clay eliminated when the clay is heated to essentially constant weight at about 1800° F. The clay is then ground to a suitable fineness.

For use as a thickener in drilling muds the resultant powder is then dispersed in water or brine and special purpose additives incorporated. For example, fluid loss of attapulgite mud may be controlled by addition to the aqueous clay dispersion of organic fluid-loss reducing agents such as starch, sodium carboxymethyl cellulose, ferro chrome lignosulfonate and quebracho or combinations thereof.

A typical saturated salt (NaCl) water yield of commercial (extruded) attapulgite clay heretofore available was of the order of 125 to 150 bbl./ton, as compared with a saturated salt-water yield of only about 35 bbl./ton for a commercial hydratable bentonite. In saturated gypsum solutions, the yields of commercial attapulgite clay and bentonite drilling clays are typically 140 to 150 and 68 bbl./ton, respectively. Therefore, it is apparent that considerably higher drilling rates can be realized through the use of attapulgite drilling clay when making up mud with salt or gypsum solutions or in drilling formations when the mud becomes contaminated with salts of Na, Ca and Mg. Also, there is considerable economic advantage in such instances to use attapulgite drilling clay rather than bentonite clay which requires costly chemical treatment to obviate the flocculating effect of contaminating ions.

While the yield of attapulgite clay in contaminated systems is excellent and has led to the extensive use of attapulgite drilling clays for such use, the above-mentioned advantages of attapulgite clay could be augmented by bringing about, at a modest price, an increase in the yield of attapulgite clay in contaminated systems, especially saturated salt systems. However, fresh-water or semicontaminated water is frequently used in making up muds for drilling contaminated formations. Attapulgite drilling clays presently available are eminently suitable for making up such muds since the clay has a high yield in these systems. In fact, the fresh-water yield of attapulgite clay is usually somewhat higher than its salt-water yield and is typically about 150 bbl./ton or more for a good grade of commercial extruded attapulgite clay. It is important to at least maintain, and preferably to improve, the high yield of the clay in fresh or semicontaminated systems simultaneously while improving the saturated salt-water mud-making properties of the clay. A reduction in fresh-water yield of attapulgite clay simultaneously with improvement in saturated salt-water yield would limit the clay to those applications where a high dissolved salt content is present at all times in the aqueous phase of the mud. Likewise, the advantages of attapulgite clay in saturated gyp and salt-solublized gyp systems should also be maintained since attapulgite drilling clay is widely used in making up gyp muds.

Attempts have been made to improve the yield of attapulgite clay to obtain even higher drilling rates and to improve the economics of drilling with this clay. Generally speaking, the methods have been of the nature of improvements in the physical processing of the clay, as exemplified by selective mining, improved extrusion, drying and grinding techniques. While improvement in the performance of the clay in salt saturated systems has been of prime interest, it has, for reasons brought out above, been necessary to maintain, if not to improve the properties of the clay in fresh-water systems.

Prior efforts to improve upon attaplugite drilling clay have had limited success only and, before our discovery, an attapulgite drilling clay having a saturated salt-water yield of about 150 bbl./ton was considered to be representative of the best grade of salt-water drilling clay. While it has long been known that the viscosity of aqueous suspensions of "zeolitic clays" such as attapulgite clay varied somewhat with the nature of solutes in the aqueous phase, especially in saturated system (note U.S. 2,094,316 to Roy Cross and Matthew Forbes Cross), such observations led to no practical method for increasing the yield of attapulgite clay in saturated salt-water systems without adversely effecting its yield in fresh-water systems. To the best of our knowledge, prior to our discovery, commercial attapulgite clays have never been treated, before or after being made up into muds, with chemicals to increase their mud yields.

Accordingly, an object of this invention is the provision of a simple, economical chemical treatment for increasing the salt-water mud yield obtainable with attapulgite clay without imparting the yield of the clay in most other contaminated or semicontaminated systems or in fresh water.

A more particular object of this invention is the provision of an attapulgite drilling mud clay admixture of this character, which admixture may be handled in the field in the same way as prior attapulgite drilling mud clays without the need for special equipment.

Still another object of this invention is the provision of a versatile attapulgite clay drilling mud clay product which has a substantially higher saturated salt-water yield than attapulgite drilling clay per se, as well as excellent yield in other contaminated and semicontaminated systems and in fresh water.

A more particular object is the provision of an attapulgite drilling clay admixture having an API saturated salt-water mud yield of at least about 185 bbl./ton, preferably more, and an API fresh-water yield not less than the saturated salt-water mud yield.

After extensive experimentation with a wide variety of inorganic reagents, including various alkali and alkaline earth metal salts, oxides and hydroxides, we have discovered that small quantities of hydratable MgO and of $Mg(OH)_2$ are unique in their effect upon the properties of aqueous dispersions of colloidal attapulgite clay. More specifically, we have found that when hydratable MgO or $Mg(OH)_2$ is admixed with attapulgite clay, the mixture has a saturated salt-water yield that is substantially greater than that of attapulgite drilling mud clay, while the yield of the mixture in fresh-water, saturated gyp and various semicontaminated systems is not less than and is sometimes substantially greater than the yield of attapulgite clay alone in such systems. To obtain this result, it has been found that the $Mg(OH)_2$ or equivalent hydratable MgO additive must be present with the clay in amount such that when a mud-forming quantity of the admixture is used, the additive will be present in an amount that exceeds the theoretical solubility of the magnesium material in the aqueous phase. However, it is of the essence of this invention to limit the upper quantity of additive because the effectiveness of the MgO or $Mg(OH)_2$ in improving yield of attapulgite clay decreases when used in excessive amount. In fact, a superabundance of the magnesium compound additive may actually decrease the salt-water yield, as well as fresh-water yield, of the admixture well below that of the clay in the absence of the magnesium compound. It has also been found that aqueous muds made up with out admixture of colloidal attapulgite clay and $Mg(OH)_2$ or hydratable MgO must be substantially free from agents which tend to solubilize the magnesium compound since such agents negate the effectiveness of the compound when used with our clay.

Attapulgite clay-magnesium compound admixtures of this invention can be made up into drilling fluids by agitating a previously formed admixture into fresh water or into aqueous solutions of salt, gypsum or the like. Less desirably, the magnesium compound additive can be incorporated separately into the aqueous phase of the mud. No special equipment is needed since the usual mixers or agitators used in making up attapulgite drilling muds may be employed.

When drilling formations containing salt beds, salt domes, gyp, anhydrite and/or combinations thereof, our novel fluids, even those made up with fresh water, will maintain their high yield upon contamination without the necessity for chemical treatment required with bentonite muds.

Drilling muds of this invention have yield points, gel strengths, densities and water-loss properties essentially the same as those made up with attapulgite drilling clay in the absence of our magnesium compound additive.

The yield of attapulgite clay-MgO or $Mg(OH)_2$ admixtures of this invention will vary somewhat with the system in which yield is measured, with the starting clay, with the quantity of MgO or $Mg(OH)_2$ used, and with the processing employed. Different samples of attapulgite clay, while having essentially the same chemical analysis, may vary somewhat in their response to treatment with a given quantity of MgO or $Mg(OH)_2$. With some attapulgite clays, the use of an optimum quantity of additive results in a mixture whose saturated salt-water yield is only 10% greater than attapulgite clay used singly as the mud thickening agent. This, in effect, means that 1,800 pounds of the attapulgite clay mixture will suffice when formerly a ton of the same grade of attapulgite clay was required. With many attapulgite clays, an improvement in saturated salt-water yield of at least about 30% (often as much as about 50%) may be realized and this result is normally obtained simultaneously with an improvement of 20% to 30% in fresh-water yield.

Attapulgite clay-magnesium compound admixtures of this invention are especially adapted for use in making up drilling muds whose aqueous phase contains NaCl in excess of 10,000 p.p.m., especially 50,000 p.p.m. (saturated NaCl). They are, of course, equally useful in making up fresh or semi-contaminated muds adapted for drilling formations containing salt domes or high pressure salt-water flows. Our admixture may also be especially advantageous in making up gyp and salt-solubilized gyp muds since the MgO or $Mg(OH)_2$ additive also usually brings about some increase in the yield of attapulgite clay in such systems. When an improvement in fresh-water yield takes place simultaneously with the improvement in salt-water yield, especially in those cases where the improvement results in a clay having a fresh-water yield of 200 bbl./ton or more, it will be advantageous to use the admixture even in making up fresh-water muds where no contamination is encountered during drilling since only about half as much of this clay will produce a mud of the same viscosity as a good grade of Wyoming bentonite.

While we do not wish to be bound by any theory or hypothesis as to why hydratable MgO and $Mg(OH)_2$ accomplish these results whereas other basic material and magnesium salts do not, experimentation leads to our present belief that our magnesium compounds are present in the aqueous phase of the drilling mud as positively charged finely divided solid particles, probably colloidal, and that such particles crosslink and thereby space the negatively charged attapulgite needles in the aqueous phase. This would explain why our results are not realized by using equivalent quantities of soluble magnesium salts and why our additives lose their effectiveness when solubilized, as by incorporation of ammonium salts in the aqueous phase of the drilling mud. Further, this would explain why similar quantities of soluble bases adversely effect the fresh-water yield of attapulgite clay and thereby differ in kind from our additive in their effect on the rheology of attapulgite clay dispersions.

We are aware that it has been suggested in the past to alter the viscosity of clay suspensions by means of chemical additives. Generally speaking, most of these suggestions in the drilling mud field have been applicable only to hydratable clays (e.g., bentonite, illite) which, as mentioned, thicken aqueous systems by swelling, a mechanism unrelated to that by which attapulgite functions to thicken aqueous liquids. Many of the suggestions have aimed to obviate the flocculation of bentonite muds in certain contaminating systems which are substantially without effect on attapulgite clay. Thus, for example, in accordance with the teachings of U.S. 2,828,258 to Thompson, from 1 to 15 lbs./bbl. of $Mg(OH)_2$ is incorporated in a high pH calcium base (bentonite) mud to prevent viscosity buildup under high temperature well conditions and U.S. 2,856,356 to Weiss et al. teaches the incorporation in the aqueous phase of a drilling mud of an ammonium salt solubilized $(Mg(OH)_2)$ in amount of about 2 lbs./bbl. to stabilize and harden normally dispersing shale encountered during drilling.

We are also aware that it had been suggested by Roy Cross, U.S. 1,943,584, to mix swelling (bentonite) clay with any one of a number of alkalis, inclusive of MgO and Portland cement, to decrease the quantity of clay required to gel water. This discovery was made prior to the discovery by Roy Cross and Matthew Forbes Cross of the especial usefulness of zeolitic clays, such as mined in Attapulgus, Georgia, in making up salt-water drilling muds. Later (U.S. 2,044,758), Roy Cross and Matthew Forbes Cross noted that a material such as MgO, while improving the viscosity of bentonite in fresh water, did not prevent the flocculation of bentonite which normally occurs when brine or salt solutions are used as the suspension medium for the clay. This difficulty was avoided, in accordance with the teachings of this patent to Cross et al. by using various "zeolitic" clays alone instead of a mixture of hydratable clay and MgO in salt-water and brine systems. No suggestion was ever made to increase the salt-water viscosity of the zeolitic clay, such as mined in Attapulgus, Georgia, which Cross et al. readily perceived to be exceptional as compared with the salt-water viscosity of bentonite or bentonite admixed with MgO or Portland cement.

More specifically, in carrying out this invention, the hydratable MgO we use may be prepared by calcining (burning) magnesite $(MgCO_3)$, magnesium hydroxide or magnesium basic carbonate in the temperature range between about 400° C. and about 900° C. A suitable commercial grade of hydratable magnesium oxide is the so-called "caustic-burned magnesia." So-called "dead-burned magnesia" is not suitable for the purposes of this invention. Magnesium hydroxide and hydratable oxide from sea water and brines may be used. Brucite, a naturally occurring fibrous form of $Mg(OH)_2$ should also be satisfactory.

In addition to essentially pure grades of MgO or $Mg(OH)_2$, we can employ mixtures of these materials with a minor weight proportion of CaO or $Ca(OH)_2$. Recommended are mixtures containing CaO or $Ca(OH)_2$ in amount within the range of about 10% to 35%, based on the weight of the magnesium compound. Mixtures of these alkaline earth metal bases with attapulgite clay are especially recommended since their fresh-water yields are generally higher than fresh-water yields of mixtures of attapulgite clay with MgO or $Mg(OH)_2$ in the absence of lime adjuvant. This further increase in fresh-water yield which is realized through the use of lime with magnesia is surprising and unexpected since small quantities of lime alone do not increase the fresh-water yield of attapulgite clay. In fact, small quantities of lime frequently reduce the fresh-water yield of attapulgite clay appreciably.

In producing colloidal attapulgite clay-magnesium compound admixtures of this invention, it will suffice to mix and blend thoroughly a magnesium compound (and powdered calcium compound adjuvant, if desired) with preground clay (e.g., clay which is 100% minus 48 mesh, Tyler series), preferably extruded ground clay. However, optimum results are usually realized when the clay is ground in the presence of the additive. Two methods for producing our preferred mixtures in which clay is ground in the presence of an alkaline earth base additive are described in the examples. In one, the MgO or $Mg(OH)_2$ is pugged with clay and water prior to extrusion of the clay and the extruded mixture is ground (usually to 100% minus 48 mesh, Tyler series) and mildly dried. This procedure effects a very intimate admixture of additive with clay in the ground particles. In accordance with another procedure the additive is thoroughly mixed with moist clay extrudate and the mixture dried and ground—this procedure appears to lead to a coating of clay particles with adherent powdered additive.

Admixtures of attapulgite clay containing magnesium as the hydroxide (or mixtures containing $Ca(OH)_2$ as an adjuvant) should be stored with restricted access of air to prevent carbonate formation.

By the term "attapulgite clay" we refer to a clay material whose predominant mineral species is the clay mineral attapulgite. Attapulgite is a hydrous magnesium aluminum silicate of the empirical formula:

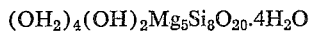

Trivalent cations such as $Al^{+++}$ are equivalent to 1.5 $Mg^{++}$ and may proxy for some of the magnesium (and probably some $Si^{+4}$) in this structure. A typical chemical analysis of attapulgite clay (volatile free basis) is:

| | Percent |
|---|---|
| $SiO_2$ | 67.0 |
| $Al_2O_3$ | 12.5 |
| MgO | 11.0 |
| $Fe_2O_3$ | 4.0 |
| CaO | 2.5 |
| Others | 3.0 |
| | 100.0 |

While in the analysis the magnesium (or proxying aluminum) are expressed as oxides, actually they are present as complex silicates, linked to silicon atoms through oxygen linkage. The calcium content of attapulgite clay is principally in the form of the carbonate.

The attapulgte clay we use in producing our improved drilling fluids is a colloidal grade which has never been dried to a free moisture (F.M.) below about 7%, F.M. being defined as the weight per cent of a material eliminated by heating the material to essentially constant weight at about 220° F. Preferably, the clay has a F.M. of at least 10%. There is no upper limit to the F.M. of the clay, although usually it will not exceed 25% so as to avoid the expense of shipping large quantities of water.

The clay may be raw clay which has received no treatment other than grinding, although preferably the clay has been extruded (with or without MgO or

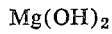

additive) before drying and grinding. Wet screening of the raw clay before extrusion may also be desirable.

Drying of the extruded clay (or extruded admixture of clay and our alkaline earth base or bases) should be at a product temperature not to exceed about 300° F. since higher temperatures have an adverse effect on the clay yield. Thus, it will not suffice to dry the clay at product temperatures of the order of 400° F. or higher, even when drying time is limited to provide a clay having a F.M. above 7%. The particle size of the ground extruded clay or clay admixture should be 100% minus 48 mesh (Tyler series) and may be considerably finer, such as 100% minus 325 mesh.

The quantity of MgO, $Mg(OH)_2$ (or mixture thereof with a minor weight proportion of CaO or $Ca(OH)_2$), we prefer to employ is within the range of about 0.25% to about 4%, based on the weight of the clay. The additive is not effective when used in an amount less than about 0.25%. As indicated by the data reported in the accompanying figures and examples, yield improvement (saturated salt and fresh water) increases rapidly with increment of magnesium compound additive above ¼% until a sharp decrease in effectiveness occurs when the additive is present in amount in excess of about 4%. Upon further addition, the yield of the clay decreases gradually until, at the 10% to 20% level, the yield may be condesirably less than that of the clay in the absence of additive. The examples and figures indicate also that distinctly optimum results are usually obtained with the magnesium compound additive present in amount within the range of 1% to 3.5%, with the optimum varying within this range with method of forming the clay admixture and, to some extent, with the starting clay. Using the preferred admixtures produced by grinding clay in the presence of MgO or $Mg(OH)_2$ additive, optimum yield improvement is usually realized at the 2% to 3% level. Generally speaking, the recommended proportion of additive is that which effects optimum improvement in saturated salt-water yield consistent with the realization of a fresh-water yield not less than the saturated salt-water yield.

As mentioned, it is also within the scope of this invention to incorporate our alkaline earth metal base or mixture of bases separately from attapulgite clay in making up the improved drilling fluids of this invention. The quantity of additive will usually be within the range of about 0.03 to 1 lb./bbl., preferably about 0.1 to 0.5 lb./bbl., with the optimum quantity varying with clay concentration. Generally speaking, the additive is not effective when present in an amount less than 0.1 lb./bbl. or in an amount appreciably greater than 0.5 lb./bbl.

The invention will be illustrated further by the following examples taken with the accompanying figures in which:

FIGURE 1 is a plot showing the relationship between API mud yield in saturated and fresh-water systems and additions of various amounts of hydratable MgO to drilling mud grades of attapulgite clay. Various methods of incorporating the additive with the clay are represented.

FIGURE 2 is a plot showing the percent improvement in saturated salt-water yield upon addition of various amounts of hydratable MgO to drilling mud grades of attapulgite clay. Various methods of incorporating MgO with the clay are represented. Also plotted, for purpose of comparison, is the percent reduction in saturated salt-water yield upon addition of various amounts of hydratable MgO to a swelling bentonite clay.

Figure 1:
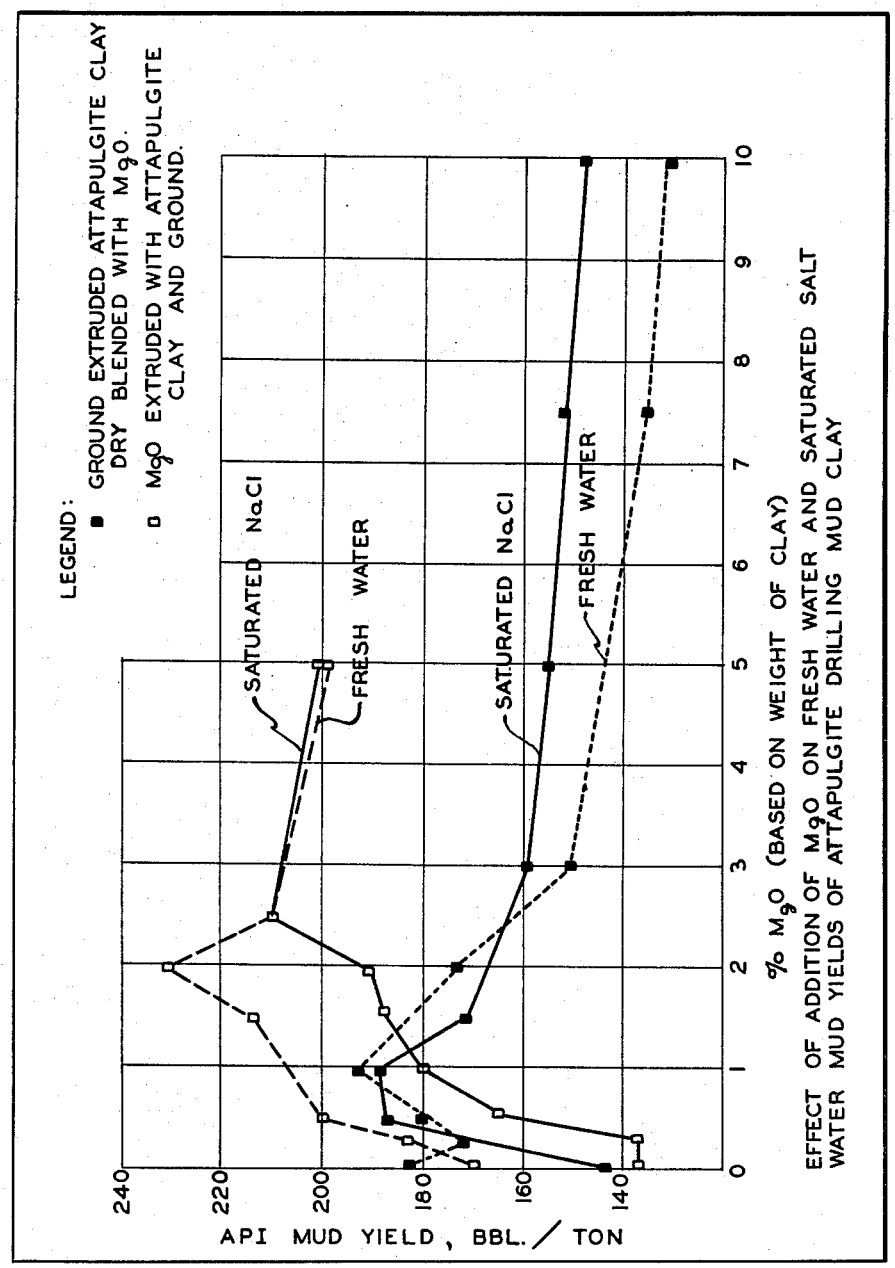

In the examples, fresh-water muds were made up by adding clay to 350 cc. of distilled water and stirring for 20 minutes. Saturated aqueous NaCl and $CaCl_2$ solutions were used in place of distilled water in making up saturated contaminated muds. NaCl solubilized gypsum muds were produced by adding clay and 6 gm. gypsum to 350 cc. of a 2.5% salt solution, followed by stirring for 20 minutes. In making up saturated gypsum solutions, clay plus 6 gm. of gypsum were added to 350 cc. of distilled water and stirred for 20 minutes.

All yields reported in the examples and figures are API yields and, unless otherwise indicated, represent yields of samples stirred for 20 minutes, aged for 24 hours, then stirred for 5 minutes and evaluated. Viscosity values reported in the examples (and used in determining API yields) refer to Stormer values (600 r.p.m.) on samples stirred for 20 minutes, aged 24 hours, then stirred for 5 minutes.

All samples of attapulgite clay were colloidal grades, generally analyzing (on a volatile free clay basis) about 67.0% $SiO_2$; 12.5% $Al_2O_3$; 11% MgO; 4.0% $Fe_2O_3$; 2.5% CaO; Others 3.0%.

All MgO and $Mg(OH)_2$ and other test additives were minus 325 mesh as supplied.

EXAMPLE I

EFFECT OF MgO ON THE YIELD OF ATTAPULGITE CLAY

In accordance with this invention, raw attapulgite clay (F.M. about 44%, V.M. about 50%) from a deposit known to provide high yield drilling mud clay was pugged at room temperature with various quantities of calcined (caustic burned) magnesite and water sufficient to provide a mix of extrudable consistency (V.M. about 60%). The pugged mixture was extruded in an auger extruder through a die plate having a ½ inch thickness and ¼ inch holes, producing pellets about ¼ inch to ½ inch long. The extruded pellets having a V.M. of about 58% were dried in a rotary externally fired dryer for about one hour to a V.M. of about 25% at a dryer temperature of 250° F. to 300° F. The dried pellets were fed to a Raymond roller mill provided with a classifier to remove sand and were milled to 100% minus 48 mesh and about 50% minus 325 mesh. The procedure was repeated to produce extruded clay containing no calcined magnesite as a control.

The API saturated salt-water and fresh-water yields of these samples were determined with the results reported in Table I and ploted in FIGURE 1.

*Table I*

EFFECT OF MAGNESIA ON YIELD OF ATTAPULGITE CLAY (EXTRUDED MIXTURES)

| Percent MgO (based on clay wt.) | API yield, bbl./ton | |
|---|---|---|
| | Saturated NaCl | Fresh water |
| 0 | 138 | 176 |
| ¼ | 137 | 173 |
| ½ | 165 | 184 |
| 1 | 180 | 200 |
| 1½ | 188 | 214 |
| 2 | 190 | 231 |
| 2½ | 210 | 210 |
| 5 | 200 | 197 |

These data show that exceptional improvement in both salt-water yield and fresh-water yield was realized with MgO additions of 1% and 5%. Also shown is that the effectiveness of the MgO in fresh-water and saturated salt-water systems leveled off with increase of MgO content above 2½%.

Figure 2:
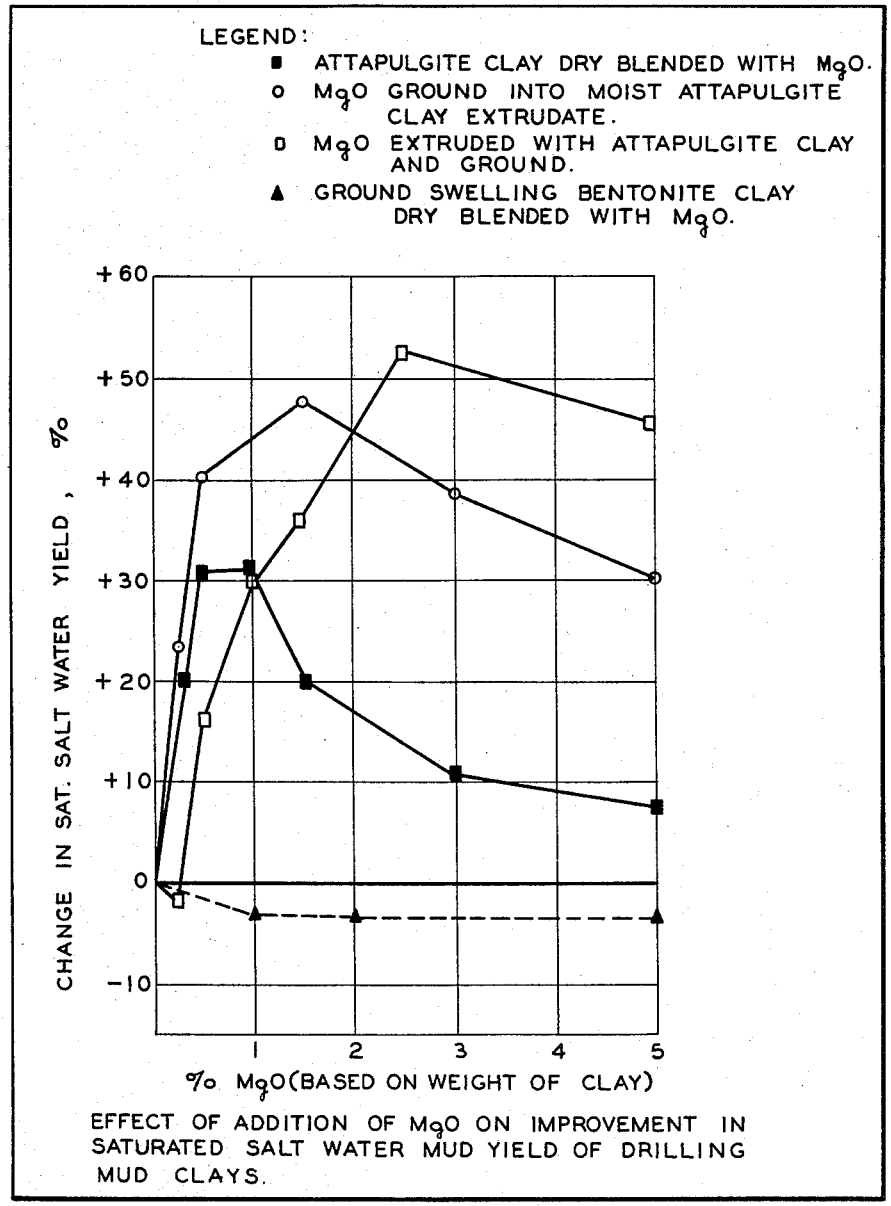

The calculated percent change in salt-water yield upon incorporation of various quantities of MgO in the attapulgite clay extrudate is plotted in FIGURE 2 which shows that optimum yield improvement was obtained at the 2½% MgO level where a 52% increase in saturated salt-water yield was obtained with a 24% increase in fresh-water yield.

EXAMPLE II

STUDY OF COMPARATIVE EFFECT OF MgO ADDITIVE ON FRESH AND SALT-WATER YIELDS OF ATTAPULGITE CLAY AND WYOMING BENTONITE CLAY

Minus 200 mesh particles of a high yield grade of extruded colloidal attapulgite clay (F.M. about 20%) were thoroughly blended with various portions of minus 325 mesh calcined hydratable magnesite. This procedure was repeated using minus 200 mesh Wyoming bentonite clay. The various mixtures were made up into drilling muds and the yields of the various clay admixtures were measured with the results tabulated in Table II.

*Table II*

EFFECT OF MAGNESIA ADDITION ON YIELD OF ATTAPULGITE AND BENTONITE CLAYS (DRY BLENDED MIXTURES)

| Attapulgite clay | | | Wyoming bentonite clay | | |
|---|---|---|---|---|---|
| Percent MgO | API yield, bbl./ton | | Percent MgO | API yield, bbl./ton | |
| | Sat. salt water | Fresh water | | Sat. salt water | Fresh water |
| 0 | 143 | 183 | 0 | 37 | 112 |
| ¼ | 171 | | | | |
| ½ | 187 | 180 | | | |
| 1 | 189 | 192 | 1 | 36 | 200 |
| 2 | 171 | 173 | 2 | 36 | 243 |
| 3 | 159 | 150 | | | |
| 5 | 155 | 155 | 5 | 36 | 290 |
| 7½ | 152 | 135 | | | |
| 10 | 147 | 130 | | | |

These data show that hydratable MgO effected an exceptional improvement in the yield of Wyoming bentonite clay in fresh water (159% increase at the 5% MgO level), but had little effect on its salt-water yield which remained extremely low. On the other hand, MgO in amount within the range of ¼% to 2% increased the salt-water yield of attapulgite clay by at least 20%, with a maximum increase of about 30% at the 0.5% to 1.0% level. This comparison is illustrated in FIGURE 2.

Unlike its action with bentonite, the MgO brought about a modest improvement in the fresh-water yield of attapulgite clay at the 1% level, while quantities of MgO in excess of 2% resulted in a rapid progressive decrease in the fresh-water yield of attapulgite clay.

A comparison of these data for attapulgite clay-MgO admixtures with those of the previous example (employing a roughly comparable starting clay) is shown in FIGURE 1; the corresponding calculated percent salt-water yield changes are illustrated in FIGURE 2. These figures show that a greater improvement in the salt (and fresh water) yield of attapulgite clay was possible when the calcined magnesite was admixed with the clay before extrusion and the mixture ground, as in Example I. Thus, a maximum of a 52% improvement in salt-water yield (and a 24% improvement in fresh-water yield) was obtained at the 2½% magnesia level by the extrusion procedure of Example I; on the other hand, with the dry blends of prepulverized extruded clay and magnesia of this example, the maximum salt-water yield improvement was about 32% (at the 0.5% to 1.0% level), with a modest improvement (5%) in fresh-water yield at the 1% MgO level.

EXAMPLE III

EFFECT OF MgO ON THE YIELD OF ATTAPULGITE CLAY (MAGNESIA GROUND WITH MOIST CLAY EXTRUDATE)

This example illustrates still another preferred method of producing the improved attapulgite drilling mud thickening agent of this invention.

Raw attapulgite was pugged with water and extruded as in Example I. Portions of this extrudate, having a V.M. of about 5%, were thoroughly blended with various quantities of pulverized calcined (caustic burned) magnesite and then dried to a V.M. of about 25%. The mixtures were pulverized in a Raymond roller mill provided with a classifier to remove sand and were milled to 100% by weight minus 48 mesh. The procedure was repeated without adding MgO to the extrudate before drying to produce a control mud thickening agent. The results are reported in Table III, and the calculated percent change in salt-water yield of the clay upon incorporation of the MgO additive in this manner is shown in FIGURE 2.

*Table III*

EFFECT OF MAGNESIA ON API MUD YIELD OF ATTAPULGITE CLAY (MAGNESIA GROUND WITH MOIST CLAY EXTRUDATE)

| Percent MgO | API yield, bbl./ton | |
|---|---|---|
| | Sat. salt water | Fresh water |
| 0 | 152 | 217 |
| ¼ | 187 | 232 |
| ½ | 213 | 253 |
| 1 | 215 | 270 |
| 1½ | 224 | 263 |
| 2 | 219 | 258 |
| 3 | 210 | 256 |
| 5 | 200 | 265 |

These data show that about a 40% to 47% improvement in salt-water yield with a corresponding increase of about 17% to 25% in fresh-water yield was obtained by this procedure at the ½% to 3% MgO level. These results further confirm our observation that methods which entail grinding magnesia in the presence of the extruded attapulgite clay are generally superior to dry blending techniques for obtaining admixtures of our magnesium compounds with attapulgite clay.

the clay was used in amount of 14 lbs./bbl. The pH and Stormer viscosity of each system were measured with the results tabulated in Table V.

Table V

EFFECT OF AMMONIA SALT ON THE VISCOSITY OF AQUEOUS DRILLING MUDS CONTAINING ATTAPULGITE CLAY-MgO MIXTURE (14 LBS./BBL. CLAY AND 0.14 LB./BBL. MgO)

| Salt | $NH_4$ salt added, lbs./bbl. | Sat. salt water | | | Fresh water | | |
|---|---|---|---|---|---|---|---|
| | | $NH_4OH$, cc./350 cc. | Stormer visc., cp. | pH | $NH_4OH$, cc./350 cc. | Stormer visc., cp. | pH |
| 0 | | 0 | 32 | 8.5 | 0 | 54 | 9.8 |
| 0 | | 0.50 | 33 | 8.4 | 0.5 | 54 | 10.0 |
| $NH_4Cl$ | 1 | 1.11 | 28 | 8.4 | 0 | 35 | 8.5 |
| $NH_4Cl$ | 2 | 1.44 | 29 | 8.4 | 0 | 45 | |
| $NH_4$ acetate | 1 | 0.64 | 27.7 | 8.5 | 0 | 37 | 8.7 |
| $NH_4$ acetate | 2 | 1.06 | 27.7 | 8.5 | 0.55 | 40 | 8.6 |
| $NH_4NO_3$ | 1 | 0.55 | 25.0 | 8.4 | 0 | 40.3 | 8.3 |
| $NH_4NO_3$ | 2 | 1.02 | 26.5 | 8.4 | 0.55 | 40.3 | 8.4 |
| $(NH_4)_2SO_4$ | 1 | 0.99 | 25.5 | 8.4 | 0 | 36.5 | 8.6 |
| $(NH_4)_2SO_4$ | 2 | 1.47 | 25.5 | 8.4 | 0.49 | 33.5 | 8.6 |

EXAMPLE IV

EFFECT OF $Mg(OH)_2$ ON THE YIELD OF ATTAPULGITE CLAY

Various quantities of $Mg(OH)_2$ (Baker, N.F., IX grade) were dry blended with colloidal attapulgite clay, in accordance with this invention, and the API saturated salt-water and fresh-water mud yields of the admixtures were measured and compared with these properties of the control clay, with the results reported in Table IV.

Table IV

EFFECT OF $Mg(OH)_2$ ON MUD YIELD OF ATTAPULGITE CLAY

| Percent Mg (OH)$_2$ | Saturated salt-water yield, bbl./ton | Fresh-water yield, bbl./ton |
|---|---|---|
| 0 | 172 | 168 |
| ¼ | 185 | 170 |
| ½ | 198 | 168 |
| 1 | 202 | 175 |

These data, compared with the data reported in Example II, show that $Mg(OH)_2$ had essentially the same effect as MgO on the saturated salt and fresh-water mud yield of attapulgite clay.

EXAMPLE V

EFFECT OF SOLUBILIZATION OF MgO ON MUD YIELD OF ATTAPULGITE CLAY a. Experiments were conducted to demonstrate the adverse effect of ammonium salts—solubilizing agents for MgO—on the saturated salt-water and fresh-water yields of compositions of this invention.

Control saturated salt-water and fresh-water drilling muds were made up with a preblended mixture of attapulgite drilling mud clay and 1% by weight of hydratable MgO. Various ammonium salts were dissolved in portions of the control.

In some of the samples ammonium hydroxide was added to bring the pH of the ammonium salt treated mud to approximately that of the control. In all instances The results show that in each instance the incorporation of an ammonium salt to a drilling mud made up with colloidal attapulgite clay and MgO adversely affected the viscosity of muds with fresh and saturated salt water. The data indicate that in every instance, an ammonium salt will reduce the saturated salt-water and fresh-water yield of attapulgite clay-MgO admixtures.

b. To determine whether or not incorporation of larger quantities of MgO, together with ammonium salts, would overcome the viscosity breakdown effect of ammonium salt mud additives, 14 lbs./bbl. attapulgite clay muds containing hydratable MgO in total amount of 2.14 lbs./bbl. were made up with and without 2 lbs./bbl. ammonium salt additive. The viscosity and pH of the muds were measured.

As expected, it was found that the controls (no ammonium salts) containing a total of 2.14 lbs./bbl. MgO (15.2% MgO, based on the clay weight) had a salt-water viscosity substantially lower than that of the control mud of part a. of the example which contained only 0.14 lb./bbl. MgO and no ammonium salt. In fact, the addition of excess MgO had a more adverse effect on salt-water viscosity than the use of ammonium salts did.

It was found also that the adverse effect of ammonium salts on both fresh and saturated salt-water vicsosities of attapulgite drilling muds was augmented by increasing the MgO content from 0.14 to 2.14 lbs./bbl. The data are reported below.

Table VI

EFFECT OF AMMONIUM SALT ON THE VISCOSITY OF AQUEOUS DRILLING MUDS CONTAINING ATTAPULGITE CLAY-MgO MIXTURE [1]

| MgO additive, lbs./bbl. | Salt added | | Sat. salt water | | Fresh water | |
|---|---|---|---|---|---|---|
| | Salt | Lbs./bbl. | Stormer visc., cp. | pH | Stormer visc., cp. | pH |
| 2 | | | 21 | 8.8 | 55 | 9.5 |
| 2 | $NH_4Cl$ | 2 | 14 | 8.5 | 32 | 8.9 |
| 2 | $NH_4Ac$ | 2 | 14 | 8.5 | 32 | 9.1 |
| 2 | $NH_4NO_3$ | 2 | 14 | 8.5 | 34 | 9.0 |
| 2 | $(NH_4)_2SO_4$ | 2 | 14 | 8.5 | 38 | 9.1 |

[1] Clay +1% MgO used in amount of 14 lbs./bbl. (total MgO content of mud = 2.14 lbs./bbl.).

EXAMPLE VI

The API mud yields of an extruded MgO-attapulgite clay mixture containing 2% hydratable MgO in various contaminated systems were measured. The extruded mixture was produced by the method described in Example I. The API fresh-water yield of the extruded attapulgite clay control (no MgO) was 187 lbs./bbl., while the API fresh-water yield of the clay extruded with 2% MgO was 201 lbs./bbl.

*Table VII*

MUD YIELD OF EXTRUDED MIXTURES OF ATTAPULGITE CLAY AND MgO (2% MgO) IN CONTAMINATED AND SEMI-CONTAMINATED SYSTEMS

| Percent MgO | Contaminant | Concentration of contaminant | API yield, bbl./ton |
| --- | --- | --- | --- |
| 0 | MgSO₄ | Saturated | 208 |
| 2 | MgSO₄ | do | 171 |
| 0 | CaCl₂ | do | 158 |
| 2 | CaCl₂ | do | 218 |
| 0 | MgCl₂ | do | 162 |
| 2 | MgCl₂ | do | 178 |
| 0 | CaSO₄ | 6 lbs./bbl. | 154 |
| 2 | CaSO₄ | 6 lbs./bbl. | 163 |
| 0 | 2.5% NaCl, CaSO₄ | 6 lbs./bbl. | 158 |
| 2 | 2.5% NaCl, CaSO₄ | 6 lbs./bbl. | 203 |
| 0 | 5% NaCl | | 182 |
| 2 | 5% NaCl | | 213 |
| 0 | 10% NaCl | | 162 |
| 2 | 10% NaCl | | 204 |
| 0 | 20% NaCl | | 146 |
| 2 | 20% NaCl | | 204 |
| 0 | 35% NaCl | Saturated | 143 |
| 2 | 35% NaCl | do | 206 |

The data show that mixtures of attapulgite clay with 2% MgO had a high yield in all of the contaminated systems. The data further indicate that the viscosity of attapulgite drilling muds of our invention will vary less in viscosity upon variation of soluble salt contaminant and contaminant quantity than will attapulgite muds formulated without MgO additive. For example, the mud yield of attapulgite without MgO (control) will vary from 187 in fresh water up to 208 in saturated MgSO₄ and will decrease to 143 in saturated NaCl. On the other hand, the extruded 2% MgO-attapulgite mixture, in accordance with this invention, will have an exceptionally high yield within the range of 200 to 210 bbl/ton in fresh water, as well as in NaCl solutions of 5% to 35% concentration and in salt-solubilized gyp solution. Further, the data show that the yield of the extruded admixture will be higher than that of the control clay in all contaminated systems investigated except for saturated MgSO₄ where the yield of the mixture is still high.

Figure 3:
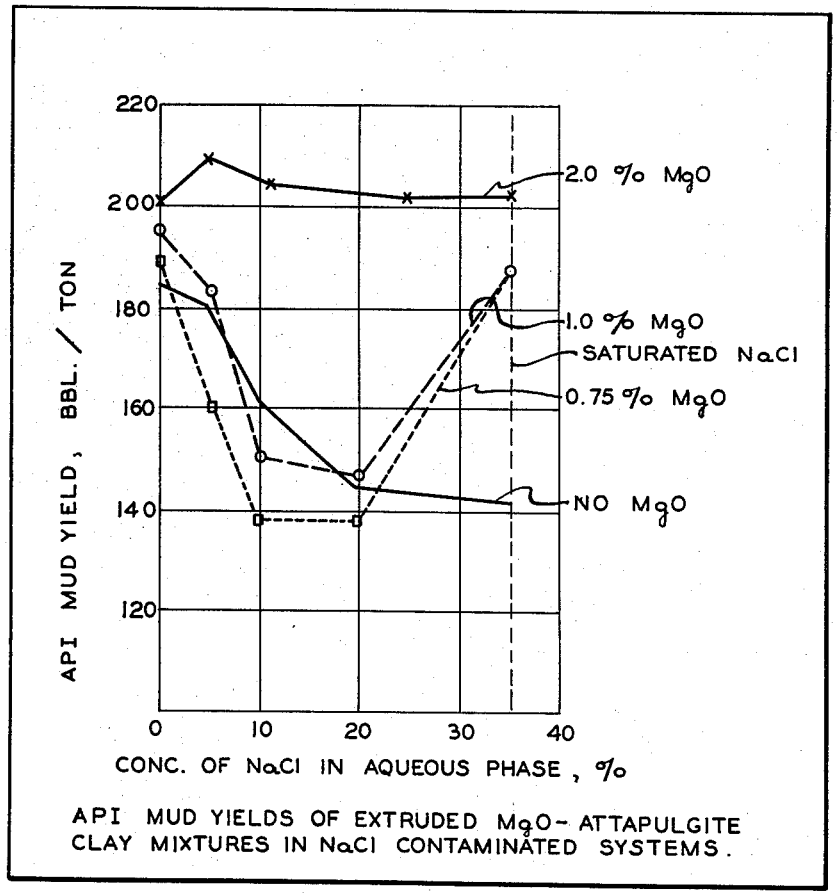
FIGURE 3 is a plot showing API yield for extruded attapulgite clay and extruded MgO-attapulgite mixtures (0% to 2% MgO content) in salt solutions ranging from 0% to 35% (saturated) NaCl.

In FIGURE 3, mud yield is correlated with NaCl concentration in the system for attapulgite drilling muds containing 0% and 2% MgO, based on the clay weight. Also plotted is data for the salt systems obtained using 0.75% and 1.0% MgO, based on the clay weight. The figure indicates that the yields of systems containing no MgO additive will vary considerably with change of NaCl concentration from 0% through 35% and, as mentioned above, the yield of systems containing 2% MgO additive will be essentially constant with change of NaCl concentration. While some yield stabilization in concentrated NaCl systems can be obtained with 0.75% or 1.0% MgO, the data in FIGURE 3 indicate that the improvement will be modest as compared with the benefit of adding 2% MgO to the attapulgite clay.

EXAMPLE VII

EFFECT ON VARIOUS Mg COMPOUNDS ON VISCOSITY OF ATTAPULGITE CLAY DRILLING MUDS

A drilling mud grade of attapulgite clay and a magnesium compound identified in Table VIII were added to a saturated NaCl solution. The procedure was repeated with distilled water. Each mixture was stirred for 20 minutes, aged for 24 hours, restirred for 5 minutes and the Stormer viscosity measured with the results reported in Table VIII.

*Table VIII*

EFFECT OF ADDITION OF 1% AND 2% OF VARIOUS MAGNESIUM COMPOUNDS TO ATTAPULGITE CLAY

| Attapulgite conc., lbs./bbl. | Mg compd. | Conc. of Mg compd., lbs./bbl. | Stormer visc., cp. | |
| --- | --- | --- | --- | --- |
| | | | Sat. salt water | Fresh water |
| 14 | None | | 15 | 54 |
| 14 | MgO | 0.14 | 32 | 54 |
| 14 | MgO | 0.28 | 21 | 55 |
| 14 | MgSO₄.7H₂O | 0.14 | 16 | 20 |
| 14 | MgSO₄.7H₂O | 0.28 | 16 | 21 |
| 14 | MgCl₂.6H₂O | 0.14 | 15 | 20 |
| 14 | MgCl₂.6H₂O | 0.28 | 16 | 17 |
| 14 | MgAc₂.4H₂O | 0.14 | 20 | 24.2 |
| 14 | MgAc₂.4H₂O | 0.28 | 26 | 31.2 |
| 14 | Mg(NO₃)₂ | 0.14 | 14.2 | 17 |
| 14 | Mg(NO₃)₂ | 0.28 | 15 | 17 |

Of the various magnesium compounds investigated, only hydratable MgO increased the saturated salt-water viscosity of attapulgite without substantially decreasing its fresh-water viscosity. In fact, of the magnesium salts, only magnesium acetate effected a significant increase in salt-water viscosity, while the other magnesium salts had little if any effect on salt-water viscosity of the clay.

EXAMPLE VIII

Figure 4:
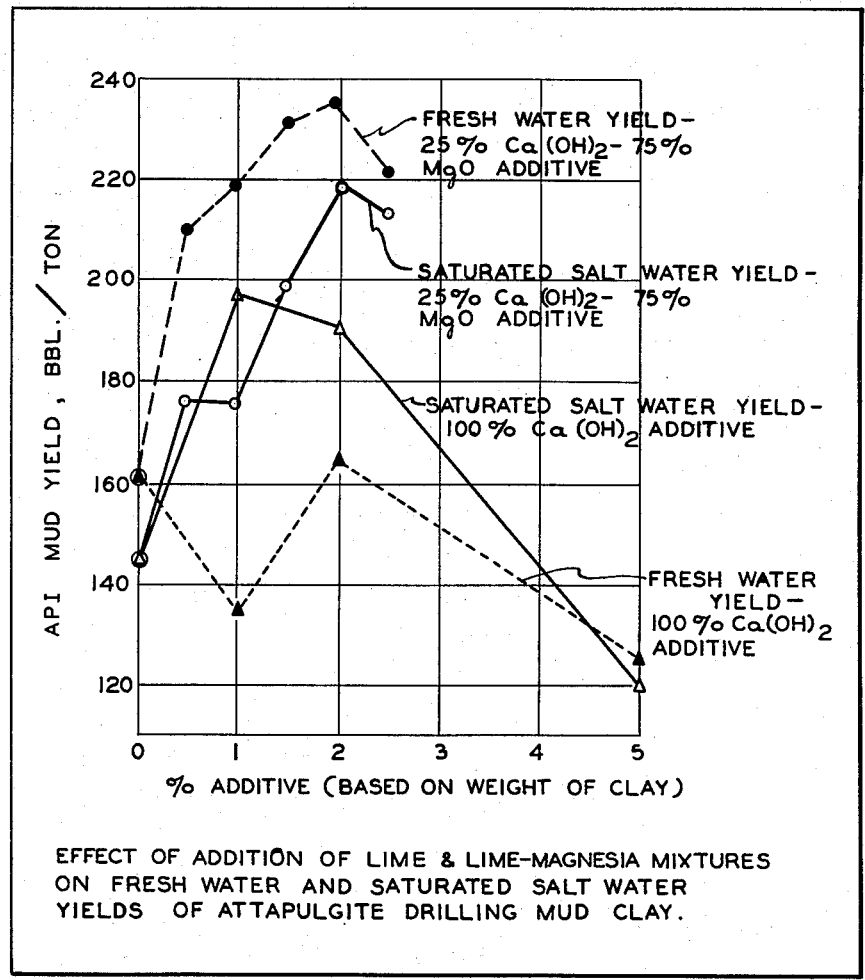
FIGURE 4 is a plot showing API yields of extruded mixtures of attapulgite containing 0% to 2.5% of a (75% to 25%) mixture of MgO and $Ca(OH)_2$, in accordance with this invention. For purposes of comparison, API yields of mixtures of attapulgite clay and $Ca(OH)_2$, without MgO, are included.

EFFECT OF LIME AND LIME-MAGNESIA MIXTURES ON YIELD OF ATTAPULGITE CLAY a. Ca(OH)₂ was dry blended with drilling mud grades of attapulgite clay with the results reported in Table IX and plotted in FIGURE 4.

*Table IX*

EFFECT OF Ca(OH)₂ ON THE MUD YIELD OF ATTAPULGITE CLAY

| Percent lime | Yield, bbl./ton | | | |
| --- | --- | --- | --- | --- |
| | Saturated salt water | Percent increase | Fresh water | Percent increase |
| 0 | 142 | 0 | 161 | 0 |
| 1 | 198 | 40 | 135 | −16 |
| 2 | 192 | 35 | 165 | 3 |
| 5 | 120 | −16 | 125 | −22 |

The data show that while small amounts of lime improved the saturated salt-water yield of attapulgite clay, the corresponding fresh-water yield was in each instance substantially less than the saturated salt-water yield of the admixture. In contrast, with corresponding additions of MgO to the clay, the fresh-water yield will generally be substantially the same as, or greater than, the saturated salt-water yield.

b. Various mixtures of hydrated lime and MgO (caustic burned magnesite) were dry blended with a drilling mud grade of attapulgite clay and the mixtures made up into saturated salt-water and fresh-water drilling muds which were evaluated for Stormer viscosity and pH. The results are tabulated in Table X.

Table X

EFFECT OF Ca(OH)$_2$-MgO ADMIXTURES ON VISCOSITY OF ATTAPULGITE CLAY DISPERSIONS

| Attapulgite clay conc., lbs./bbl. | 50% lime, 50% MgO admixture conc., lbs./bbl. | 25% lime, 75% MgO admixture conc., lbs./bbl. | Sat. salt water, cc. | Dist. water, cc. | Stormer visc., cp. | pH |
|---|---|---|---|---|---|---|
| 14 | 0 | 0 | 350 |  | 17 | 7.4 |
| 14 | 0.14 | 0 | 350 |  | 43 | 9.2 |
| 14 | 0.28 | 0 | 350 |  | 42 | 9.4 |
| 14 | 0.70 | 0 | 350 |  | 38 | 10.0 |
| 14 | 0 | 0 |  | 350 | 24 | 8.6 |
| 14 | 0.14 | 0 |  | 350 | 41 | 9.8 |
| 14 | 0.28 | 0 |  | 350 | 30 | 10.4 |
| 14 | 0.70 | 0 |  | 350 | 29 | 10.8 |
| 14 | 0 | 0 | 350 |  | 17 | 7.2 |
| 14 | 0 | 0.14 | 350 |  | 35 | 9.1 |
| 14 | 0 | 0.28 | 350 |  | 40 | 9.4 |
| 14 | 0 | 0.70 | 350 |  | 51 | 9.9 |
| 14 | 0 | 0 |  | 350 | 24 | 8.9 |
| 14 | 0 | 0.14 |  | 350 | 51 | 10.0 |
| 14 | 0 | 0.28 |  | 350 | 60 | 10.0 |
| 14 | 0 | 0.70 |  | 350 | 50 | 10.5 |

The tabulated results indicate the usefulness of

MgO–Ca(OH)$_2$ mixtures as additives in saturated salt-water and fresh-water attapulgite drilling clay suspensions and indicate an obvious superiority of a 75% to 25% MgO–Ca(OH)$_2$ admixture over a 50% to 50% admixture in both fresh-water and saturated salt-water systems where the 75% to 25% mixtures generally produce higher viscosities than equivalent quantities of the 50% to 50% admixtures.

c. Hydrated lime was substituted for 25% by weight of the caustic burned magnesite in the extrusion procedure of Example I. Mud yields of ground, dried extruded mixtures of attapulgite containing from 0% to 2.5% by weight of 75% MgO–25% Ca(OH)$_2$ admixtures were measured with the results plotted in FIGURE 4. These results show that improvement in fresh-water yield paralleled improvement in saturated salt water at all levels of use of the admixture, with optimum saturated salt-water and fresh-water yields being obtained with 2% addition of the Ca(OH)$_2$–MgO admixtures. Data, also in FIGURE 4, for drilling muds made up with Ca(OH)$_2$ as the sole additive with the clay indicate that Ca(OH)$_2$ in the absence of magnesium compound was ineffective in improving the fresh-water mud-making properties of attapulgite clay.

EXAMPLE IX

EFFECT OF VARIOUS ALKALIES ON YIELD OF ATTAPULGITE CLAY

In accordance with the disclosure in U.S. 2,094,316 to Roy Cross and Matthew Forbes Cross to the effect that alkalies such as NaOH or Na$_2$CO$_3$ are useful with certain zeolitic clays in producing clay dispersions of optimum viscosity, these reagents were incorporated in drilling muds, saturated salt water and fresh water, made up with our clay. The fresh-water and saturated salt-water yields of the attapulgite drilling clay muds made up with 0% to 2% NaOH and Na$_2$CO$_3$ are given in Table XI.

Table XI

EFFECT OF NaOH AND NaCO$_3$ ADDITIVE ON MUD YIELD OF ATTAPULGITE CLAY

| Additive | Percent additive, based on clay weight | API mud yield, bbl./ton | |
|---|---|---|---|
|  |  | Saturated salt water | Fresh water |
| None |  | 140 | 155 |
| NaOH | 1 | 217 | 26 |
| NaOH | 2 | 217 | 34 |
| Na$_2$CO$_3$ | 1 | 160 | 161 |
| Na$_2$CO$_3$ | 2 | 171 | 129 |

The data show that NaOH was exceptionally effective in increasing the saturated salt-water yield of attapulgite clay but was completely unsatisfactory with this clay in fresh-water systems where, at all levels of addition, the mud yield was exceptionally poor. Na$_2$CO$_3$ brought about a modest improvement in saturated salt-water yield at all levels of addition with an even more modest improvement in fresh-water yield up to the 1% level where the yield began to level off.

a. LiOH was added to salt and fresh-water drilling muds made up with attapulgite clay in amount of 1%, based on the clay weight. While the clay yield increased from 140 to 184 bbl./ton in saturated salt water upon addition of 1% LiOH, the fresh-water yield underwent a drastic reduction—from 176 bbl./ton to 116 bbl./ton.

EXAMPLE X

EFFECT OF pH ON IMPROVEMENT OF YIELD OF ATTAPULGITE CLAY

Na$_2$CO$_3$ was incorporated in distilled (fresh) water and salt-water suspension of attapulgite drilling mud clay (14 lbs./bbl.) in amount to produce a system having the same pH as systems containing the attapulgite-MgO admixtures of this invention to determine whether a mere adjustment of pH of the systems to the levels obtained with hydratable MgO additive would result in the desired improvement in fresh-water and saturated salt-water yield.

Table XII

EFFECT OF pH ON VISCOSITY OF HIGH YIELD ATTAPULGITE CLAY

| Clay conc., lbs./bbl. | Alkaline material | Conc., lbs./bbl. | Sat. salt water | | Fresh water | |
|---|---|---|---|---|---|---|
|  |  |  | Stormer visc., cp. | pH | Stormer visc., cp. | pH |
| 14 | None |  | 15 | 8.5 | 53.5 | 8.6 |
| 14 | MgO | 0.14 | 32.0 | 8.5 | 53.5 | 9.8 |
| 14 | MgO | 0.28 | 21.0 | 8.8 | 54.7 | 9.8 |
| 14 | Na$_2$CO$_3$ | 1 | 35.5 | 8.5 | 18 | 9.6 |
| 14 | Na$_2$CO$_3$ | 2 | 37.0 | 8.6 | 18 | 9.8 |

The data in Table XII indicate that viscosity of attapulgite clay suspensions do not depend solely on achieving an appropriate pH in an attapulgite drilling mud clay. Thus, upon incorporation of Na$_2$CO$_3$ in fresh-water attapulgite muds to obtain about the same pH obtained with MgO, in accordance with this invention, it was found that the fresh-water viscosities of systems containing Na$_2$CO$_3$ and MgO differed in kind.

We claim:

1. An admixture adapted for use as a thickening agent for fresh water and salt contaminated aqueous drilling muds comprising colloidal attapulgite clay and a magnesium compound selected from the group consisting of hydratable MgO and Mg(OH)$_2$ in an amount within the range of from about ¼% to 4% based on the weight of said attapulgite clay, said amount of magnesium compound being such that said admixture has an API saturated salt-water mud yield substantially higher than the API saturated salt-water yield of said clay in the absence of said magnesium compound, said admixture being further characterized by the fact that the clay therein has never been heated to a temperature greater than about 300° F.

2. The admixture of claim 1 in which said magnesium compound is admixed with a minor weight proportion, as compared with said magnesium compound, of a calcium compound selected from the group consisting of CaO and Ca(OH)$_2$.

3. An admixture adapted for use as a thickening agent for fresh water and salt contaminated aqueous drilling muds consisting essentially of colloidal attapulgite clay and a magnesium compound selected from the group consisting of hydratable MgO and Mg(OH)$_2$ in an amount within the range of from about ¼% to 4% based on the weight of said attapulgite clay, said amount of magnesium compound being sufficient to provide an admixture whose API saturated salt-water mud yield is at least 10% greater than the API saturated salt-water yield of said clay in the absence of said magnesium compound, said admixture being further characterized by the fact that the clay therein has never been heated to a temperature greater than about 300° F.

4. An admixture adapted for use as a thickening agent for fresh water and salt contaminated aqueous drilling muds consisting essentially of colloidal attapulgite clay and a magnesium compound selected from the group consisting of hydratable MgO and Mg(OH)$_2$ in an amount within the range of from about 1% to 3.5% based on the weight of said attapulgite clay, said amount being sufficient to provide an admixture having an API saturated salt-water mud yield which is at least 30% greater than the API saturated salt-water yield of said clay in the absence of said magnesium compound, said admixture being further characterized by the fact that the clay therein has never been heated to a temperature greater than about 300° F.

5. An admixture adapted for use as a thickening agent for fresh water and salt contaminated aqueous drilling muds comprising minus 48 mesh particles of attapulgite clay which has never been dried to a F.M. below about 7% and has never been heated to a temperature greater than about 300° F. and from about 1% to 3.5%, based on the weight of said attapulgite clay, of hydratable MgO, said admixture having an API saturated salt-water mud yield at least 30% greater than the API saturated salt water mud yield of said clay in the absence of said MGO and being further characterized by the fact that the API saturated salt-water mud yield and API fresh water mud yield thereof decrease substantially upon incorporation therewith of an ammonium salt of a mineral acid in amount within the range of 1 to 2 lbs./bbl.

6. The admixture of claim 5 in which said MgO is admixed with a minor weight proportion, as compared with said MgO, of a calcium compound selected from the group consisting of CaO and Ca(OH)$_2$.

7. An admixture adapted for use as a thickening agent for fresh water and salt contaminated aqueous drilling muds consisting of minus 48 mesh particles of extruded attapulgite clay which has never been dried to a F.M. below about 7% and has never been heated to a temperature greater than about 300° F. and from about ¼% to 4%, based on the weight of said attapulgite clay, hydratable MgO, said admixture having an API saturated salt-water mud yield and an API fresh water mud yield of at least about 185, said admixture being further characterized by the fact that the API saturated salt-water mud yield and the API fresh water mud yield thereof decrease substantially upon incorporation therewith of an ammonium salt of a mineral acid in amount of 2 lbs./bbl.

8. A uniform mixture adapted for use as a thickening agent for an aqueous drilling fluid and consisting of colloidal attapulgite clay which has never been heated to a temperature greater than about 300° F. and from 1% to 3.5%, based upon the weight of said clay, of hydratable MgO.

9. An aqeuous drilling fluid comprising an aqueous phase having dispersed therein colloidal attapulgite clay in mud-forming quantity and having incorporated therein a finely divided magnesium compound selected from the group consisting of hydratable MgO and Mg(OH)$_2$, said magnesium compound being present in an amount within the range of about ¼ to 4% based on the weight of said clay and sufficient to provide with said clay an admixture having an API saturated salt-water yield substantially higher than that of said clay in the absence of said magnesium compound, said aqueous phase being substantially free from ammonium salts of mineral acids.

10. The drilling fluid of claim 9 containing a minor weight proportion, relative to said magnesium compound, of a calcium compound selected from the group consisting of CaO and CA(OH)$_2$.

11. An aqueous drilling fluid comprising an aqueous phase and dispersed therein a thickening agent therefor, said thickening agent consisting essentially of attapulgite clay which has never been dried to a F.M. below about 7% and a finely divided magnesium compound selected from the group consisting of hydratable MgO and Mg(OH)$_2$ and an amount within the range of from about ¼% to 4%, based on the weight of said clay, said amount being sufficient to provide with said clay an admixture having an API mud yield in said aqueous phase which is substantially higher than the yield of attapulgite in said aqueous phase in the absence of said magnesium compound, said aqueous phase having dissolved therein at last one water-soluble mineral acid salt of a material selected from the group consisting of Na, Ca and Mg and being substantially free from ammonium salts and having a pH within the range of about 8.5 to 9.8.

12. An aqueous drilling fluid comprising an aqueous phase having sodium chloride dissolved therein and having dispersed therein a thickening agent therefor, said thickening agent consisting essentially of attapulgite clay which has never been dried to a F.M. below about 7% and a finely divided magnesium compound selected from the group consisting of MgO and Mg(OH)$_2$ in amount of about 0.1 to about 0.5 lb./bbl. and sufficient to provide with said clay an admixture whose API mud yield in said aqueous phase is substantially greater than that of said clay in the absence of said magnesium compound, said aqueous phase being substantially free from ammonium salts and having a pH within the range of about 8.5 to 9.8.

13. An aqeuous drilling fluid comprising an aqueous phase and dispersed therein a thickening agent therefor, said thickening agent consisting of attapulgite clay which has never been dried to a F.M. below about 7%, a finely divided magnesium compound selected from the group consisting of MgO and Mg(OH)$_2$ in amount of about 0.1 to 0.5 lb./bbl. and a minor amount, relative to the weight of said magnesium compound, of lime, said aqueous phase being substantially free from ammonium salts and having a pH within the range of about 8.5 to 9.8.

14. An aqueous drilling fluid comprising water having dissolved therein NaCl in amount of at least 10,000 p.p.m. and having dispersed therein a mud-forming quantity of colloidal attapulgite clay and a magnesium compound selected from the group consisting of hydratable MgO and Mg(OH)$_2$, said magnesium compound being present in an amount within the range of from about ¼% to 4% based on the weight of said clay and sufficient to provide with said clay an admixture having an API mud yield in said NaCl solution substantially greater than that of said clay in the absence of said magnesium compound, said aqueous phase being substantially free from ammonium salts of mineral acids.

15. The drilling fluid of claim 14 wherein the salt-water is saturated salt-water and the pH is about 8.5 to 9.0.

16. The drilling fluid of claim 14 having gypsum incorporated therein.

17. An aqueous drilling fluid comprising water saturated with gypsum and having dispersed therein a mud-forming quantity of colloidal attapulgite clay, said clay having incorporated therein in finely divided form a magnesium compound selected from the group consisting of hydratable MgO and $Mg(OH)_2$, said magnesium compound being present in an amount within the range of about ¼% to 4%, based on the weight of said clay and sufficient to provide with said clay an admixture having an API saturated gypsum yield substantially higher than that of said clay in the absence of said magnesium compound, said aqueous phase being substantially free from ammonium salts of mineral acids.

18. In the rotary drilling of a well wherein a drilling fluid comprising an aqueous phase having a mud-forming quantity of colloidal clay dispersed therein is circulated in the bore hole and wherein the dissolved mineral acid salt content of the aqueous phase containing dispersed colloidal clay undergoes substantial variation in concentration during the time that the fluid is circulated in the borehole, the improvement which comprises utilizing as the sole mud-forming ingredient of said drilling fluid a uniform mixture consisting essentially of colloidal attapulgite clay and from about 1% to 4%, based on the weight of said clay, of hydratable MgO, whereby the viscosity of said drilling fluid is maintained substantially constant and at a high value even when the dissolved salt content of said drilling fluid undergoes substantial variation in concentration.

19. The method of claim 18 wherein the concentration of said salt in said drilling fluid varies during drilling within the range of from substantially zero to saturation.

20. The method of claim 19 wherein said salt is sodium chloride.

References Cited by the Examiner

UNITED STATES PATENTS

| | | | |
|---|---|---|---|
| 1,795,011 | 3/31 | Cross | 252—309 |
| 1,867,063 | 7/32 | Dawe | 252—309 |
| 2,044,758 | 6/36 | Cross et al. | 252—8.5 |
| 2,665,259 | 1/54 | Buffett | 252—455 |
| 2,828,258 | 3/58 | Thompson | 252—8.5 |
| 2,856,356 | 10/58 | Weiss et al. | 252—8.5 |
| 3,079,333 | 2/63 | Malone et al. | 252—8.5 |

OTHER REFERENCES

Rogers: Compositions and Properties of Oil Well Drilling Fluids, revised ed., publ. 1953, by Gulf Publ. Co., of Houston, Texas., pages 222 and 223.

JULIUS GREENWALD, *Primary Examiner*.

UNITED STATES PATENT OFFICE
CERTIFICATE OF CORRECTION

Patent No. 3,185,642                                  May 25, 1965

Edgar W. Sawyer, Jr., et al.

It is hereby certified that error appears in the above numbered patent requiring correction and that the said Letters Patent should read as corrected below.

Column 4, line 42, for "out" read -- our --; column 9, line 12, for "and ploted" read -- and plotted --; column 10, line 43, for "5%" read -- 58% --; column 13, Table VII, column 4, line 7 thereof, for "154" read -- 151 --; column 17, line 54, for "MGO" read -- MgO --; column 18, line 31, for "and an amount" read -- in an amount --.

Signed and sealed this 5th day of October 1965.

(SEAL)
Attest:

ERNEST W. SWIDER                                          EDWARD J. BRENNER
Attesting Officer                                             Commissioner of Patents